United States Patent [19]

Beaston

[11] 4,167,216
[45] Sep. 11, 1979

[54] MULTIPLE STAND TO AID SHOEING HORSES

[76] Inventor: Bud A. Beaston, Rte. 1, Box 13, Sperry, Okla. 74073

[21] Appl. No.: 865,538

[22] Filed: Dec. 29, 1977

[51] Int. Cl.$^2$ .......................... A01L 7/00; A01L 11/00
[52] U.S. Cl. .................................................... 168/44
[58] Field of Search .............. 168/44; 119/98; 269/45, 269/88, 279, 328

[56] References Cited

U.S. PATENT DOCUMENTS

| | | | |
|---|---|---|---|
| 339,375 | 4/1886 | Cherrier | 168/44 |
| 1,146,163 | 7/1915 | Holmes | 168/44 |
| 3,696,869 | 10/1972 | Anding | 168/44 |

Primary Examiner—Louis G. Mancene
Assistant Examiner—Robert P. Swiatek
Attorney, Agent, or Firm—James H. Chafin

[57] ABSTRACT

A multiple purpose work stand for use by farriers in shoeing horses. The stand is adapted to support any combination of two of a variety of farrier work tools including a vertical hoof stand, horizontal hoof cradle and anvil member. The stand has two working positions, and has leg members such that in either position the stand is stable.

8 Claims, 8 Drawing Figures

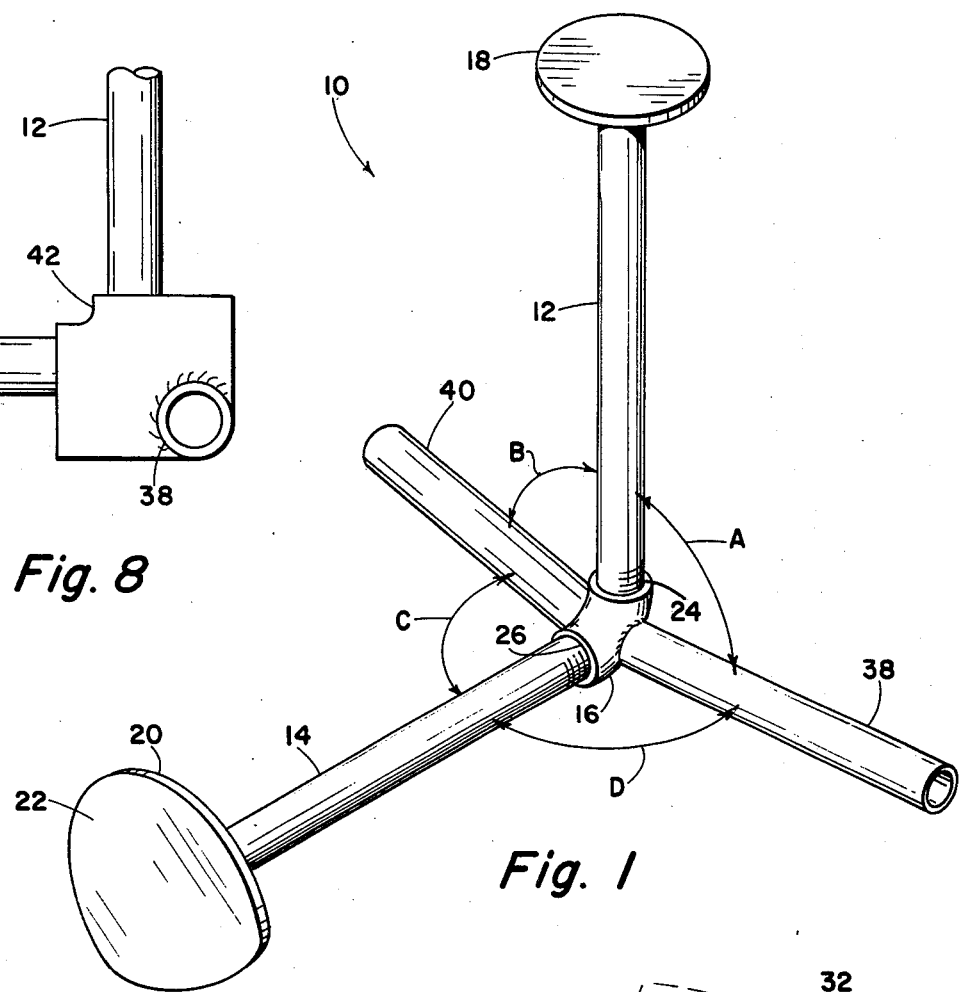
Fig. 8
Fig. 1
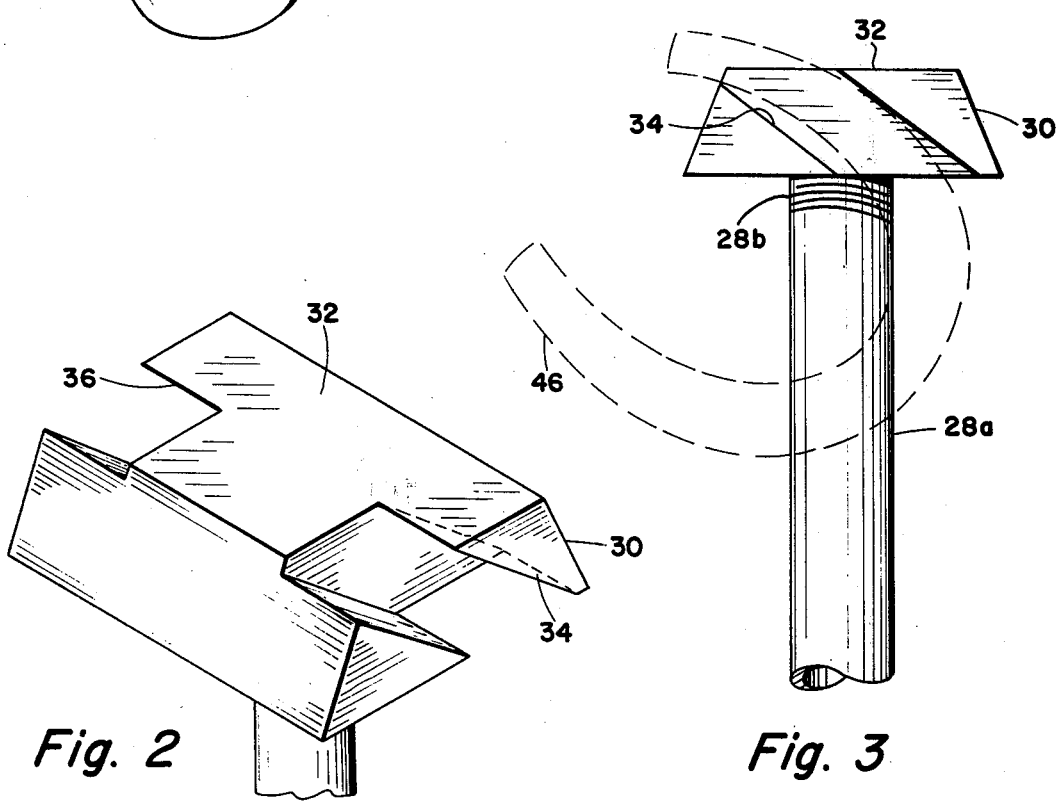
Fig. 2
Fig. 3

MULTIPLE STAND TO AID SHOEING HORSES

BACKGROUND OF THE INVENTION

1. Field of the Invention

The present invention relates to a multipurpose work stand, and more particularly but not by way of limitation, to a work stand having two stable positions such that in a first position, a first tool is presented for use and in the second position, a second tool is presented for use.

2. Description of the Prior Art

For many years, farriers have utilized either no support tools or very crude instruments for shoeing horses' hoofs and are often required to even support the horse's hoof with their own knee or leg while working on the shoe. Farriers, over the years, have tried to utilize auxiliary tools ranging from in blocks of wood to stands having a particular type of tool mounted to the stand.

However, in practice, there are several basic tools or stands needed in order to properly work on a horse's hoof and in the past the farrier has had to take with him a separate stand for each tool that he contemplates using.

Also, it is often required that the shoe be reshaped at the time the work is being done and in the past, the farrier has been required to move away from the horse and utilize an anvil and hammer in order to slightly reshape the shoe to fit the horse's hoof.

SUMMARY OF THE PRESENT INVENTION

The present invention provides a multi-purpose tool which is particularly designed and constructed to provide a complete set of work stands for the farrier to be utilized while he is working on the horse. The stand is simple in design, lightweight enough to be utilized easily at the site and is especially designed to provide needed stability while the work is being accomplished.

The stand comprises a base means which in the preferred embodiment consists of a right angle elbow member for threadedly receiving a pair of elongate pipes which are used as tool support members are provided with special purpose work plates such that when the elbow of the base means is located in one position, the one work plate will be extended upwardly from the base member to provide the needed tool while when the base member is situated in a position at right angles to the first position, the second tool extends vertically upward to be utilized as a work surface.

Secure to the sides of the elbow member are a pair of outwardly extending leg members to provide, in conjunction with the work plate which is adjacent to the ground, a tripod type support for stability.

In order to improve the stability of the work stand, the farrier may place one foot of the leg members and the other foot on the tool support member that is horizontal at the time, so that there is ample stability to the work plate being used. The leg members are also set at an angle such that the horizontal tool support member is truly horizontal instead of at an angle.

For most practical purposes there are three separate work plates which are useful in the typical shoeing operation, the first being a cradle member having a concave outer surface so that when the attached tool support member is in a vertical position, the cradle may be utilized to support the front curved surface of the horse's hoof. This allows the farrier to be able to freely work on the bottom surface of the hoof.

A second tool that has been found to be extremely useful is a small anvil type tool having at least one groove therein for supporting the horseshoe so that the horseshoe may be bent or the top surface of the anvil may be used as a hammering surface. This permits the farrier to make minor adjustments in the shape of the horseshoe in order to properly fit the horse's hoof without having to leave the site.

A third tool that is extremely helpful in fitting the shoe is a flat plate member which, in the vertical position, provides a stand to support the bottom surface of the horse's hoof, so that trimming of the hoof and final fitting of the shoe is more comfortably and easily accomplished.

DESCRIPTION OF THE DRAWINGS

Other and further advantageous features of the present invention will more fully appear in connection with a detailed description of the drawings in which;

FIG. 1 is a perspective view of a work stand embodying the present invention.

FIG. 2 is a perspective view of an anvil work tool attachable to the stand of FIG. 1.

FIG. 3 is an elevational view of an anvil work tool which is removably attachable to a support member.

FIG. 8 is a partial elevational view of an alternate base of a work stand embodying the present invention.

DETAILED DESCRIPTION OF THE PREFERRED EMBODIMENT

Figure 4:
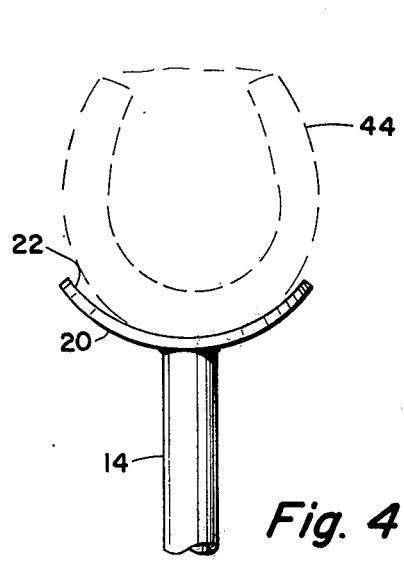
FIG. 4 is an end elevational view of a cradle work member.

Referring to the drawings in detail, reference character 10 generally indicates a multipurpose farrier's work stand comprising a pair of elongated work support members 12 and 14 having the inner ends thereof connected together at right angles by a suitable right angle joint such as the elbow member 16. The outer end of the elongated tool support member 12 is provided with a flat work plate 18, the plane of which is perpendicular to the longitudinal axis of the support member 12 for a purpose that will be hereinafter set forth.

The outer end of the tool support member 14 is provided with a cradle member or a rolled plate member 20 having a concave surface 22 extending outwardly from the outer end of the support member 14.

Figure 7:
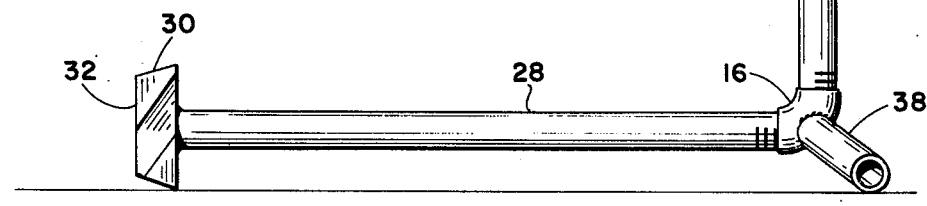
FIG. 7 is a side elevational view of the tool of FIG. 6.

The elbow member 16 is provided with threaded receptacles 24 and 26 so that the support members 12 and 14 may be interchangeably attached thereto as may be another similar support member such as the member 28 shown in FIG. 7. Support member 28 has provided on the outer end an anvil work tool 30 having a flat hammering surface 32 at the outer surface thereof and having a pair of angled slot means 34 and 36, again for a purpose that will be hereinafter set forth.

Referring to FIG. 3, reference character 28a depicts an elongated support member similar to the member 28 but having a threaded portion 28b at the outer end thereof for receiving the anvil head 30. It is seen that the device 10 could be constructed with the support members 12 and 14 being permanently fixed to the base means 16 while the work plates 18, 20 and 30 could be interchangeable at the outer ends thereof.

The base member or elbow member 16 also comprises a pair of outwardly extending oppositely disposed leg members 38 and 40, the inner ends thereof being attached to opposite sides of the elbow member 16.

It is desirable in the present invention that when the multipurpose stand is in a first position as shown in FIG. 1 with the cradle member 20 lying on the ground that the leg members 38 and 40 extend outwardly at an angle so the outer ends thereof rest on the ground in a position such that the elongate support member 14 is substantially horizontal. Likewise, when the apparatus is in its second position which would consist of the plate member 18 lying on the ground it is still desirable that the ends of the leg members 38 and 40 intercept the ground such that the elongated support member 12 is substantially horizontal which obviously causes the vertical support member to actually be in vertical position. Therefore, when the leg members 38 and 40 are of a diameter smaller than the width of the work plates 18, 20 and 30, said leg members 38 and 40 should be oriented such that each leg member is disposed at an angle of greater than 90° from each of the support members 12 and 14.

Stated another way, in referring to FIG. 1, the angle A between support member 12 and leg member 38 is greater than 90°; the angle B between the support member 12 and the leg member 40 is greater than 90°; the angle C between the support member 14 and the leg member 40 is greater than 90° and the angle D between support member 14 and leg member 38 is greater than 90° by an amount depending upon the length of the legs 38 and 40. If the legs are rather long, the amount of angle need only be slightly greater than 90° in order to raise the elbow member 16 off the ground as clearly shown in FIG. 7. However, if it is desirable for the leg support members 38 and 40 to be shorter, then the angles A, B, C and D must be substantially greater than 90° in order to lift the said elbow 16 off the ground by a sufficient amount.

If it is desirable that the support leg members 38 and 40 be oppositely extending and perpendicular to the plane of the support members 12 and 14, the attachment of their inner ends should be offset from the intersection of the longitudinal axis of the support members 12 and 14 as shown in FIG. 8.

This naturally would require a special fitting as indicated by reference character 42. However the inventor feels that the preferred embodiment would be a simple elbow since they are easily obtainable from the piping art and may be easily modified to form a workable base member.

Figure 5:
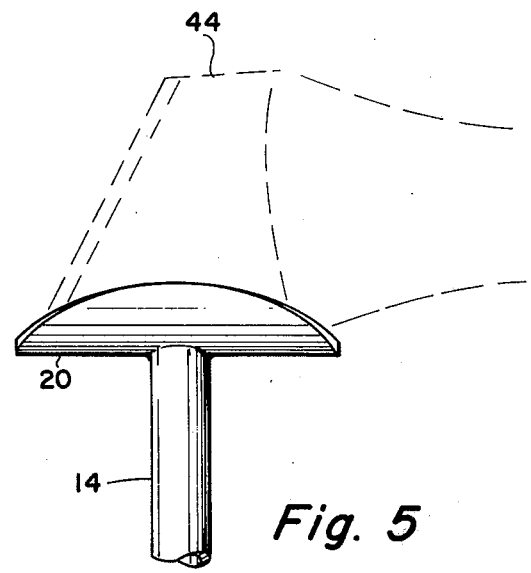
FIG. 5 is a side elevational view of the cradle work member of FIG. 4.

In operation, it has been found that a farrier engaged in horseshoeing normally needs three different types of work plates in order to accomplish a typical horseshoeing procedure. The first is the flat plate member 18 for receiving the bottom portion of a horse's hoof 44 as shown in FIG. 7. This permits the farrier to work on the outer portion of the hoof in a comfortable position. When it is desirable to work on the bottom of the horse's hoof the cradle member 20 is used as shown in FIGS. 4 and 5.

When it is necessary to rebend, straighten or modify the shape of a horseshoe 46 the anvil member 30 is utilized as shown in FIG. 3.

Figure 6:
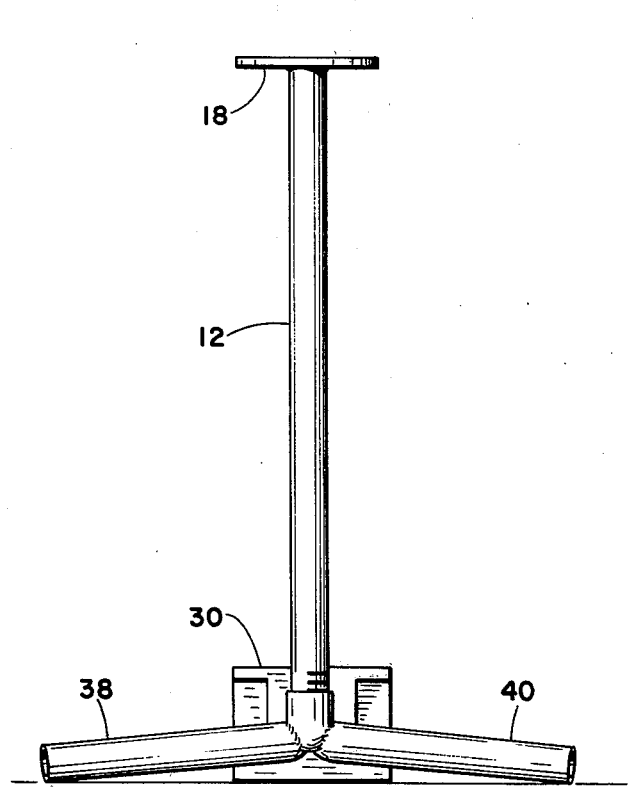
FIG. 6 is an end elevational view of the tool in one position.

It is seen in FIGS. 1, 6, and 7 that when the apparatus is in a position for utilizing the flat plate member 18, the leg members 38 and 40 hold the elbow member 16 sufficiently high off the ground so that the work support member not in use is substantially horizontal. This permits the work support member which is being used to be in a vertical position and also provides a horizontal member on which the farrier can stand or place his foot in order to provide additional stability. Further stability is acquired by the farrier placing his other foot on one of the outwardly extending leg members 38 or 40. It is further seen that if the tool were rotated 90° so that the second work plate is put into a vertical position, the orientation of the leg members are such that again the unused support member would be horizontal with respect to the ground.

From the foregoing, it is apparent that the present invention provides a portable and versatile tool to aid a farrier in shoeing horses.

Whereas the present invention has been described in particular relation to the drawings attached hereto, other and further modifications apart from those shown or suggested herein may be made within the spirit and scope of the invention.

What is claimed:

1. A farrier's multiple work stand comprising;
   a first elongated tool support member having a first enlarged special purpose work plate at the outer end thereof;
   a second elongated tool support member disposed perpendicular to the first member and having a second enlarged special purpose work plate at the outer end thereof;
   base means secured between adjacent inner ends of the first and second support members, said base means comprising a pair of outwardly extending oppositely disposed leg members, the longitudinal axis of each leg member being noncoplaner with respect to the plane of the first and second tool support members;
   whereby in one position of the work stand, the lowermost extending portions of each leg member and the lowermost extending portion of the first work plate define a plane substantially parallel to the longitudinal axis of the first support member; and in a second position of the work stand the lowermost extending portion of each leg member and the lowermost extending portion of the second work plate define a plane substantially parallel to the longitudinal axis of the second support member.

2. A farrier's multiple work stand as set forth in claim 1 wherein the work plates are removably secured to ends of the support members.

3. A farrier's multiple work stand as set forth in claim 1 wherein the work plates are secured to the support members and the support members are removably secured to the base means.

4. A farrier's multiple work stand as set forth in claim 1 wherein the first work plate is a cradle member having an outer concave curved surface for supporting the front outer wall of a horse's hoof and the second work plate is a flat plate for supporting the bottom surface of a horse's hoof.

5. A farrier's multiple work stand as set forth in claim 1 wherein the first work plate is a cradle member having an outer concave curved surface for supporting the front outer wall of a horse's hoof and the second work plate is an anvil member comprising an outer hammering surface and at least one slot for receiving a horseshoe therein for bending said horseshoe.

6. A farrier's multiple work stand as set forth in claim 1 wherein the first work plate is a flat plate for supporting the bottom surface of a horse's hoof and the second work plate is a cradle member for supporting the front outer wall of a horse's hoof.

7. A farrier's multiple work stand as set forth in claim 1 wherein the base means comprises a right angle elbow receptacle member for receiving the elongated tool support members therein, the leg members inner ends being attached to the sides of the elbow receptacle member and extending outwardly therefrom.

8. A farrier's multiple work stand as set forth in claim 7 wherein the leg members are smaller in diameter than the work plates and are disposed at an angle greater than 90° with respect to each tool support member.

* * * * *